July 14, 1970     P. B. SHEPHERD     3,520,258
PALLET
Filed Dec. 8, 1967     4 Sheets-Sheet 1
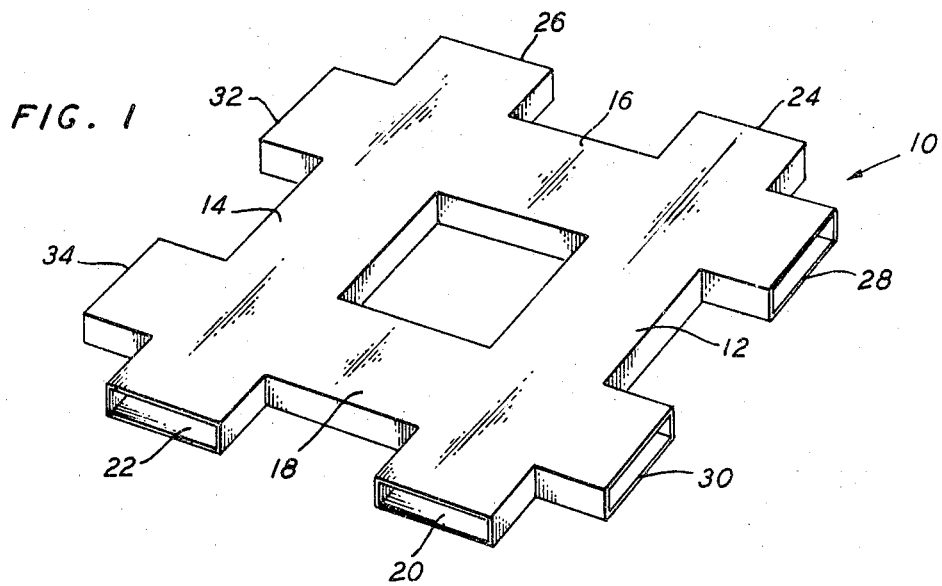
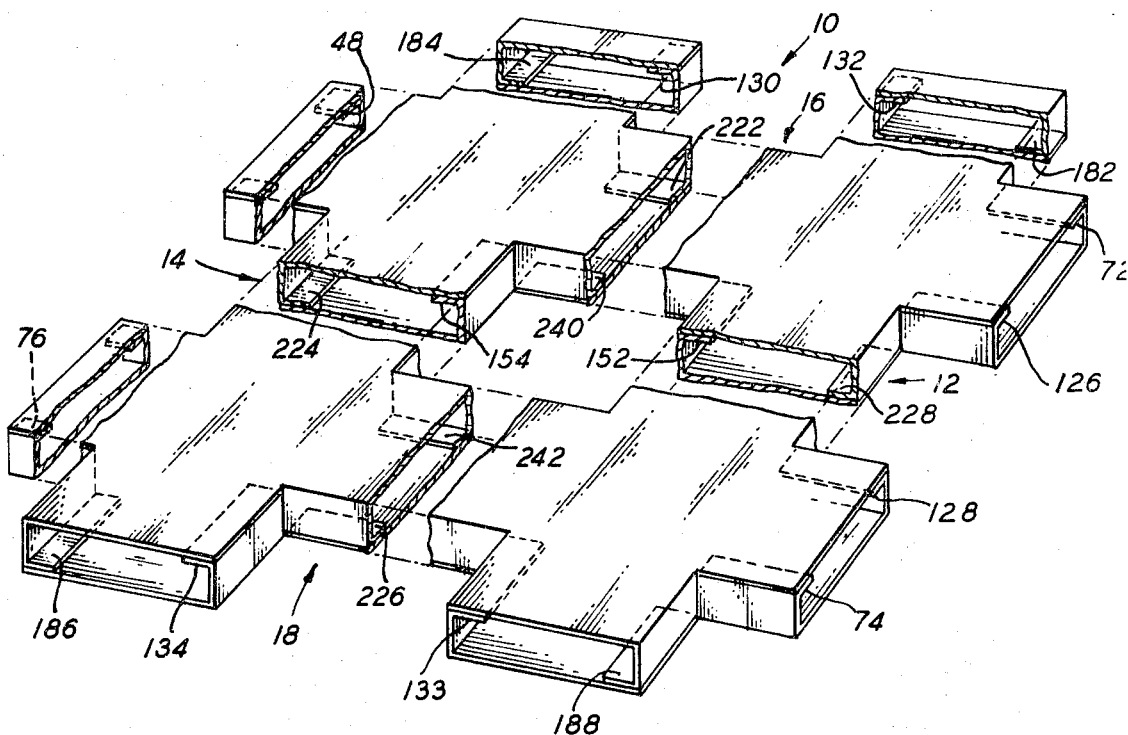
INVENTOR
PHILIP B. SHEPHERD
BY
*John A. McKinney*
ATTORNEY

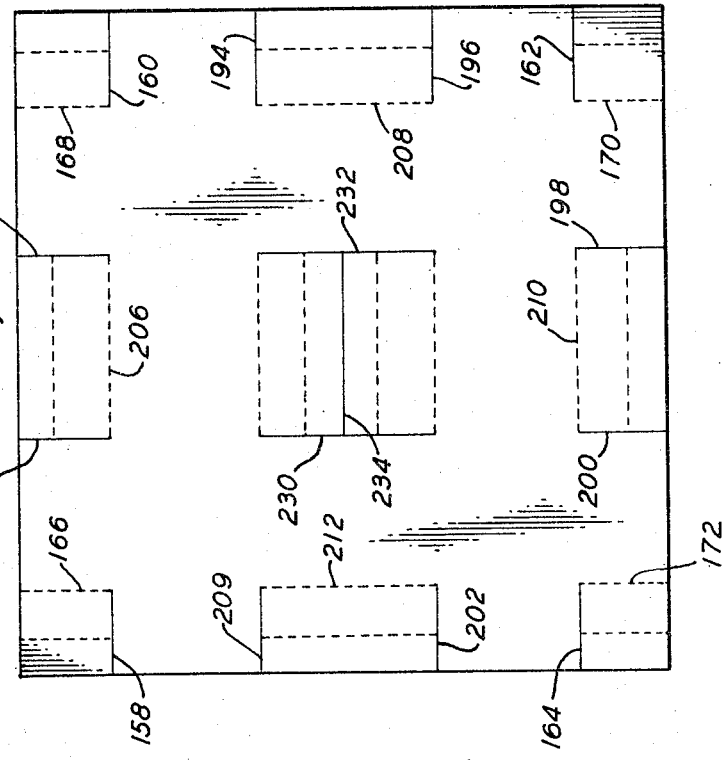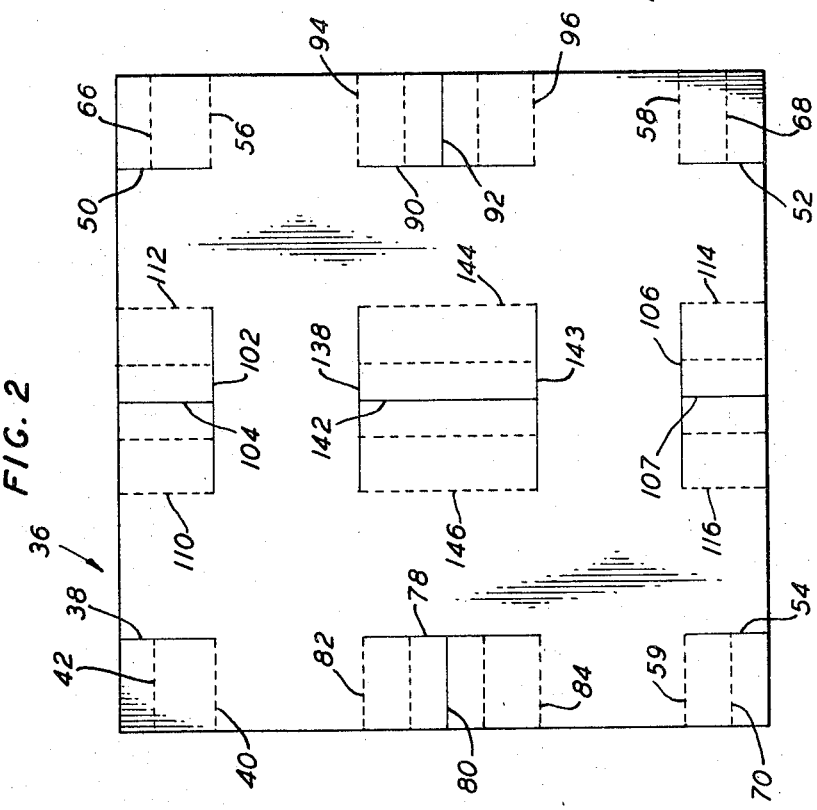

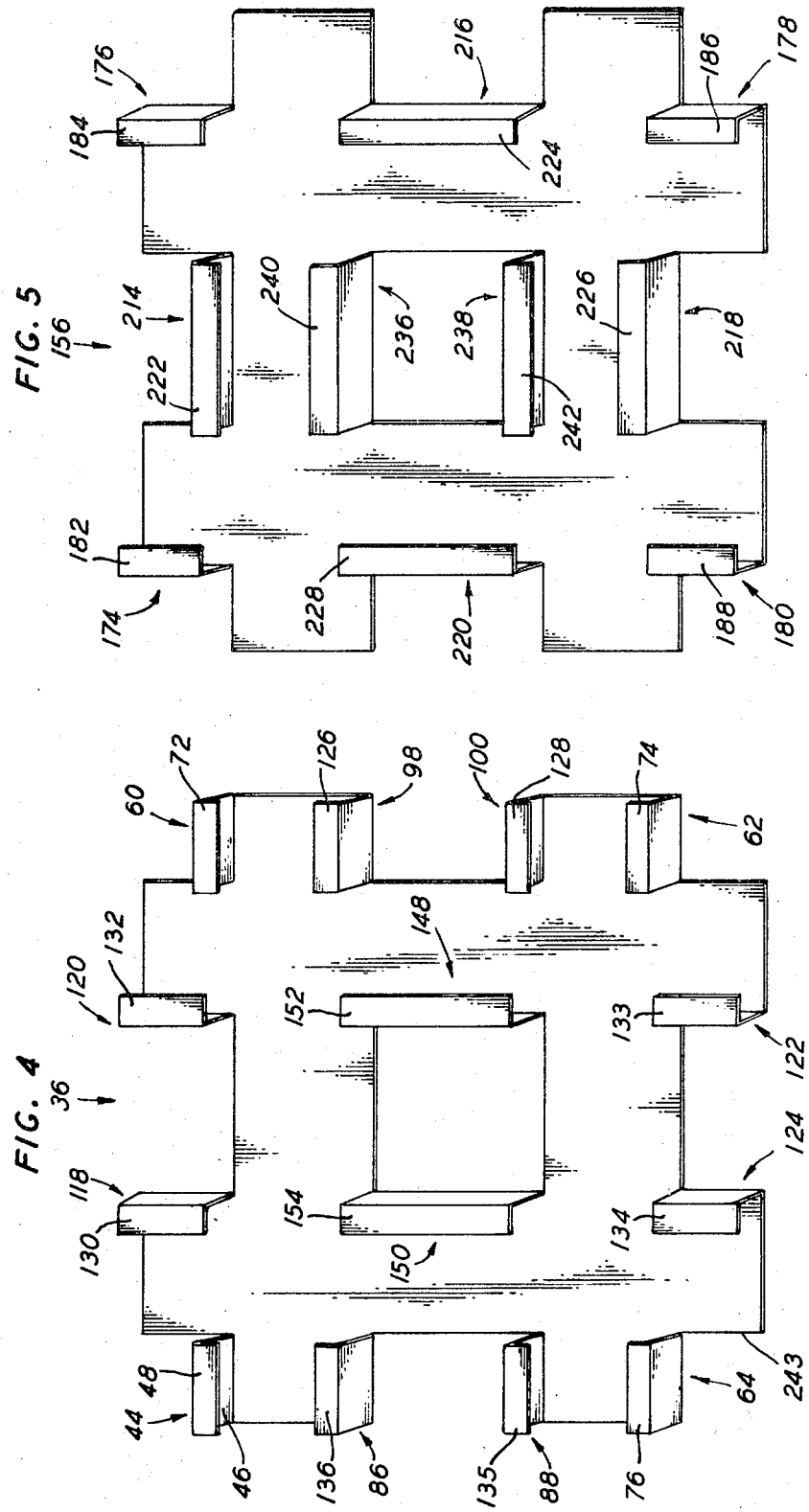

July 14, 1970  P. B. SHEPHERD  3,520,258
PALLET

Filed Dec. 8, 1967  4 Sheets-Sheet 4

United States Patent Office 3,520,258
Patented July 14, 1970

3,520,258
PALLET
Philip B. Shepherd, Middlesex, N.J., assignor to Johns-Manville Corporation, New York, N.Y., a corporation of New York
Filed Dec. 8, 1967, Ser. No. 689,039
Int. Cl. B65d 19/32
U.S. Cl. 108—58                                     4 Claims

ABSTRACT OF THE DISCLOSURE

A pallet, each side of which is capable of receiving the forks of a lift truck, is made from two single sheets of material, each sheet forming a face of the pallet and having tabs, extending at right angles thereto, secured to the opposite sheet.

BACKGROUND OF THE INVENTION

This invention relates broadly to pallets and, more particularly, to a disposable pallet capable of supporting heavy loads.

Pallets are commonly used in industry to support material during storage and shipping. They are available in many sizes and shapes and are made of various materials, some pallets being simple in design, others rather intricate. Pallets can be categorized into two basic groups, disposable pallets and reuseable pallets. Reuseable pallets are quite strong, to prevent damage during initial uses, and generally are fairly expensive to construct. Although such pallets may perform well, the extra details and costs involved, both to the customer and the manufacturer, in returning and accounting for pallets that have been shipped out, are time consuming and bothersome. It is preferable in many industries to use inexpensive pallets, capable of supporting the material to be shipped, which can be disposed of after one use. Previous attempts to design and use such a pallet have not been entirely satisfactory, however, due primarily to inability to manufacture the pallet cheaply enough and make it strong enough to support heavy loads. One low cost material often used in attempts to make a satisfactory disposable pallet is corrugated cardboard, commonly referred to as "corrugated paperboard," "corrugated fiberboard" or simply "corrugated board," which consists of two paper or cardboard facing sheets covering a core of corrugated paper or cardboard. Resulting pallets which have been strong enough for commercial use have been too expensive, however, due to the use of separate spacing and reinforcing elements and the considerable amount of time required to fabricate the pallets. A further practical drawback of many pallet designs is the inability of the pallet to be handled readily by forklift trucks, conventionally used to handle pallet loads. The many different pallet designs one sees throughout industry is an indication that no pallet has heretofore been designed which satisfies all requirements as to cost, strength, handleability, ease of fabrication and shipment, and ability to be handled readily by a forklift truck.

OBJECT OF THE INVENTION

The main object of the invention is to provide a pallet which is easily and economically manufactured, can readily be handled by a forklift truck and is capable of supporting fairly heavy loads, in the order of 2000 pounds and more, when manufactured from corrugated cardboard.

SUMMARY OF THE INVENTION

In brief, the invention comprises a pallet constructed from two sheets of material, each sheet having a plurality of tabs extending transversely therefrom and being attached to the opposite sheet. The sheets and tabs, when secured together, form enclosed passageways capable of receiving the fork of a lift truck. In a preferred embodiment, one pair of spaced parallel passageways intersects another similar pair of passageways, each passageway at opposite ends opening on opposite sides of the pallet. This arrangement presents two passageway openings at each side of the pallet for entry of the fork of a lift truck. The fact that the pallet is capable of being constructed from two sheets of material without requiring additional strengthening or spacing elements makes the pallet unusually versatile and economical. Furthermore, as described hereinafter, the fabrication of such a pallet is surprisingly simple.

DESCRIPTION OF DRAWINGS

The nature of the invention will be more fully understood and other objects may become apparent when the following detailed description is considered in connection with the accompanying drawing, wherein:

FIG. 1 is a pictorial representation of a pallet illustrating a preferred embodiment of the invention;

FIG. 2 is a plan view of a sheet of material adapted to be formed into one side of the pallet;

FIG. 3 is a view similar to that of FIG. 2, showing a sheet of material adapted to be formed into the other side of the pallet;

FIG. 4 is a pictorial representation of the sheet of FIG. 2 after tab portions thereof have been cut and folded;

FIG. 5 is a pictorial representation of the sheet of FIG. 3 after tab portions thereof have been cut and folded;

FIG. 6 is a fragmentary pictorial representation of the pallet of FIG. 1, illustrating how the various tabs shown in FIGS. 4 and 5 are related;

DETAILED DESCRIPTION OF INVENTION

Figure 7:
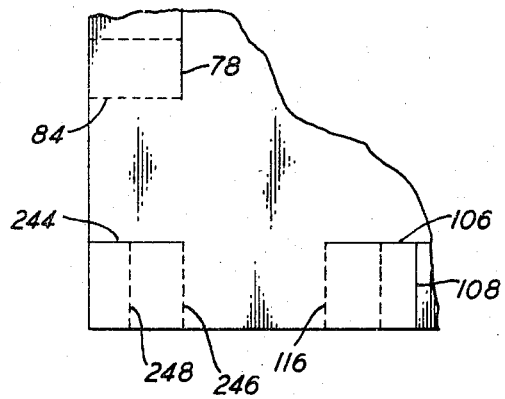
FIG. 7 is a plan view of a portion of a sheet containing a modified arrangement of a corner tab.

In the following description the terms "horizontal" and "vertical" are sometimes used for convenience and simplicity in explaining the relationships of various elements. In this context, "horizontal" should be interpreted as meaning in the direction or plane of a sheet forming, or to be used in forming, a face of a pallet, and "vertical" should be interpreted as meaning substantially at right angles to such a sheet.

The preferred form of the pallet of the present invention is indicated by reference numeral 10 in FIG. 1. The pallet is comprised generally of four elongated, enclosed passageways 12, 14, 16 and 18. The passageways can be considered as being arranged in pairs, passageways 12 and 14 being in spaced parallel relationship to form one pair and passageways 16 and 18 being in spaced parallel relationship to form another pair. Each passageway of one pair intersects the passageways of the other pair at right angles thereto at locations intermediate their ends to form the crisscross arrangement illustrated in FIG. 1. The side walls of the passageways are omitted in areas of intersection with other passageways so that the fork of a lift truck can enter the end of any passageway and extend beyond the point of intersection without obstruction. The ends 20 and 22 of passageways 12 and 14 are adapted to receive the two forks of a lift truck, as are the opposite ends 24 and 26 of the same passageways. In like manner the ends 28, 30, 32 and 34 of passageways 16 and 18 are open to receive the two forks of a lift truck. With this construction the pallet has top and bottom faces and side walls for all fork passageways and has a four-way entry feature, that is, each side is capable of receiving the forks of a lift truck.

Referring to FIGS. 2 through 5, the sheet shown in FIGS. 2 and 4 is adapted to be formed into one of the faces of the pallet 10, and the sheet shown in FIGS. 3 and 5 is adapted to be formed into the other face. Sheet 36 of FIG. 2 preferably is a square sheet, used in making a symmetrical pallet having sides of equal length. The sheet may be elongated in one direction if it is desired to make a pallet having a greater dimension in one direction than in the other. A symmetrical pallet is preferred, however, because it facilitates handling and storage and provides optimum strength. The solid lines intermediate the perimeter of the sheet represent the lines along which the sheet is to be cut and the dotted lines indicate the lines along which the sheet is to be folded. This description assumes that the material can be cut and bent or folded, as in the manner of corrugated cardboard. Other types of material can be used, however, which do not require folding, as explained later.

Generally, it can be seen that portions of the sheet are intended to be folded away from the plane of the sheet at the four corners, the center of the sheet and along each side edge intermediate the corners. Thus, by cutting along line 38 in the upper left corner of sheet 36, and folding along lines 40 and 42, the tab 44 shown in FIG. 4 is formed. The area between the fold lines 40 and 42 is the upright or vertical portion 46 of the tab 44 extending transversely of the main body of the sheet, and the area between fold lines 42 and the upper edge of the sheet 36 is the horizontal tab portion 48 extending parallel to the main body of the sheet. The other corners of the sheet 36 are treated in the same manner. They are cut along lines parallel to line 38 indicated by reference numerals 50, 52 and 54, and are folded transverse to the sheet along dotted lines 56, 58 and 59 to form tabs 60, 62 and 64, respectively. By further folding the tabs along lines 66, 68 and 70, indicated in FIG. 2, the tab portions 72, 74 and 76 are formed parallel to the main body of the sheet, as indicated in FIG. 4.

In like manner, by cutting along the line 78 and along the line 80, perpendicular to line 78 at a point midway between the extremities of line 78, and then folding upwardly at dotted lines 82 and 84, the tabs 86 and 88 are formed. The same procedure is followed on the opposite side of the sheet. Lines 90 and 92 are cut and the material folded upwardly along dotted lines 94 and 96 to form tabs 98 and 100, shown in FIG. 4. Again the same procedure is followed along the other sides of the sheet of FIG. 2. The sheet is cut along lines 102, 104, 106 and 108 and the material folded upwardly along dotted lines 110, 112, 114 and 116 to form tabs indicated in FIG. 4 at 118, 120, 122 and 124. The tabs formed from the edges of the sheet intermediate the corner portions are folded again at their extremities to form tab portions parallel to the main sheet body, as indicated by reference numerals 126, 128, 130, 132, 133, 134, 135 and 136. The sheet 36 is additionally cut along lines 138 and 140, extending parallel to the upper and lower edge portions shown in FIG. 2, and along line 142, connecting the center of lines 138 and 140 and extending perpendicular thereto. By folding the sheet material upwardly along dotted lines 144 and 146, tabs 148 and 150 are formed extending generally parallel to the left and right side edges of the sheet. An additional fold made on the tabs produces tab portions 152 and 154 extending parallel to the sheet.

Referring to FIGS. 3 and 5, the sheet 196 shown in FIG. 3 is also cut and folded along the corner portions, the edge portions intermediate the corner portions and the central portions of the sheet to form tabs which cooperate, in a manner explained hereinafter, with the tabs formed in the sheet 36. The corner portions are cut along lines 158, 160, 162 and 164 and are folded upwardly along dotted lines 166, 168, 170 and 172, to form tabs indicated in FIG. 5 at 174, 176, 178 and 180, respectively. The tabs are folded along the other dotted lines of the corner portions to form horizontal tab portions 182, 184, 186 and 188 extending parallel to the main body of the sheet. By cutting the central edge portions of sheet 156 along short lines 190, 192, 194, 196, 198, 200, 202 and 204 and folding upwardly along dotted lines 206, 208, 210 and 212, tabs 214, 216, 218 and 220, respectively, are formed, as shown in FIG. 5. By further folding along the other dotted lines in these portions, tab portions 22, 224, 226 and 228 extending parallel to the main body of the sheet are formed. The central portion of sheet 156 is cut in a similar manner to that of sheet 36 of FIG. 2, but in a direction at right angles to the cuts made in sheet 36. Thus, by cutting along lines 230, 232 and 234 and folding the resulting sheet portions upwardly, tabs 236, and 238, shown in FIG. 5, are formed. Further folding produces tab portions 240 and 242 respectively, extending parallel to the main body of the sheet.

To assemble a pallet from the sheets 36 and 156 shown in FIGS. 4 and 5, sheet 156 is superposed over sheet 36 with the tabs of boths sheets extending toward each other, so that the lower right edge of sheet 156 is aligned with the lower left edge of sheet 36. This correspondingly causes the lower left edge of sheet 156 to be aligned with the lower right edge of sheet 36, and the upper right and left corners of sheet 156 to be aligned with the upper left and right corners respectively, of sheet 36. Thus, for example, the tab portion 186 of tab 178 of sheet 156 will engage sheet 36 adjacent to the edge 243 remaining after the tab 64 has been folded upwardly. Similarly, the tab portions 188, 182 and 184 will contact the sheet 36 at the areas adjacent the edges remaining after the upward folding of tabs 62, 60 and 44, respectively.

This arrangement is brought out more clearly in FIG. 6, which shows the tab portions 130, 132, 133 and 134 of the sheet 36, shown in FIG. 4, in engagement with the upper sheet of the pallet 10, and tab portions 182, 184, 186 and 188 of the sheet 156, shown in FIG. 5, in engagement with the lower sheet of the pallet. The pallet arrangement of FIG. 6 described thus far forms the extremities of the passageways 12 and 14 of pallet 10. The intermediate portions of these passageways are formed by engagement of horizontal tab portions 224 and 228 with the lower sheet and horizontal tab portions 154 and 152 with the upper sheet. Thus the upper and lower sheets in the region of the passageways 12 and 14, in conjunction with the horizontal tab portions described and the vertical tab portions connecting the horizontal tab portions with their main sheet, form the enclosed tubular passageways 12 and 14. Without going into the description further, it can be seen by reference to the drawing that the passageways 16 and 18 are formed in a similar manner.

In order to secure the two sheets together it is merely necessary to attach the horizontal tab portions of one sheet to the main body of the opposite sheet. This can be done in any desired manner, such as by stapling or gluing, or both. To adhere the sheets together by adhesive, they are aligned with their tab faces toward each other and the horizontal tab portions substantially parallel to the main body of the sheets. The alignment can be facilitated by use of a suitable jig, such as, for example, a jig with protruding elements shaped to fit into the open spaces of the pallet design. If the pallet material requires further support in addition to its natural rigidity and resistance to the force exerted when pushing the sheets together during the gluing operation, interior supports temporarily inserted into the passageways can be used. This is easily accomplished by inserting elongated support members into first one pair of passageways, then after the gluing or stapling operation has been carried out on the tabs of these passageways, the same procedure is employed with respect to the other pair of passageways. If the use of supports is required during stapling, they should be made of, or faced with, material which is too hard to be penetrated by a staple. Hard plastic or metal is suitable for such use. Examples of a suitable adhesive are asphalt, polyamides, polyvinylacetate and the like.

An example of a typical pallet design having passageways 36 inches in length follows. The dimensions of the individual sheets should be 36 inches by 36 inches, the corner portions intermediate edge portions and central portions of which are dimensioned so that the vertical tab portions are 3 inches in height and the horizontal tab portions 2 inches in width. The width of each passageway is 8 inches and the distance between parallel passageways is 10 inches. The open space in the center of the pallet is a square 10 inches by 10 inches, thus producing a pallet having two pairs of spaced parallel passageways, each 8 inches in width and 3 inches in height, and spaced apart a distance of 10 inches. The end portion of each passageway extends beyond the nearest sidewall of the passageway it has just intersected a distance of 5 inches. A pallet of the foregoing dimensions, formed of corrugated cardboard known as V3C Board, a 400 pound test corrugated board, has in practice easily supported a load of 2400 pounds. Considerably greater loads can safely be supported by employing stronger corrugated cardboard or other material. If corrugated cardboard is used, it is apparent that in any one sheet the vertical tab portions will fall into two groups, those in which the corrugations extend along the short or vertical dimensions of the tab and those in which the corrugations extend along the long or horizontal direction of the tabs. Since the tabs in which the corrugations extend along the vertical direction are able to withstand considerably more force than those in which the corrugations extend in the horizontal direction, it is preferred that the sheets be cut so that the maximum number of tabs containing vertically extending corrugations is achieved.

Materials other than corrugated cardboard may be used, even non-foldable material, such as, for example, sheets of plastic which can be heat formed into the shapes illustrated in FIGS. 4 and 5 and secured together, either by conventional fastening or adhesive means or by heat sealing the tabs of one sheet to the opposite sheet. It should be understood that the use of the terms "fold" and "folding" in connection with a foldable material is not intended to suggest that other materials or other forming methods, such as the heat forming method just mentioned, cannot be used, but is merely employed in connection with the description of the preferred embodiment.

Figure 8:
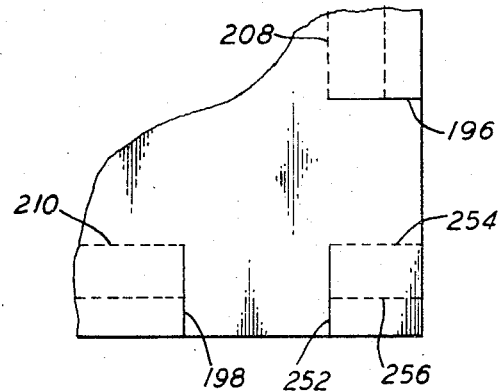
FIG. 8 is a view similar to that of FIG. 7, but showing another sheet, the corner portion of which is modified to cooperate with the tab portion of FIG. 7.
Figure 9:
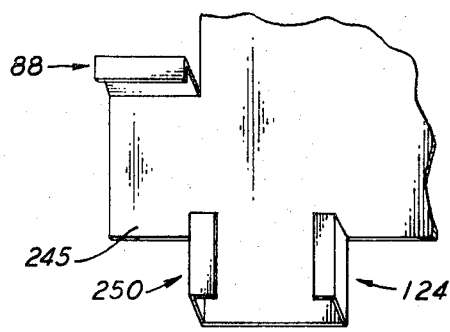
FIG. 9 is a pictorial representation illustrating the sheet of FIG. 7 in its folded position.
Figure 10:
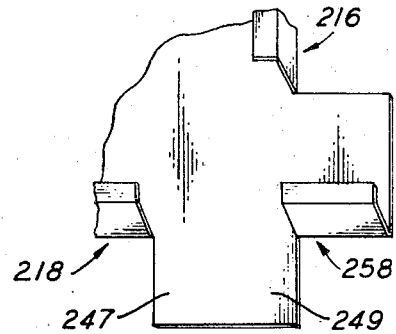
FIG. 10 is a pictorial representation illustrating the sheet of FIG. 8 in its folded position.

While the number of various designs of tab arrangements that permit utilization of two sheets of material to form, without waste, a single four-way entry pallet is not without limit, there are designs other than that illustrated by FIGS. 2, 3, 4, 5 and 6 which will permit such a pallet to be formed, and yet fall within the scope of this invention. For example, the lower left corner of the sheet in FIG. 2 can be modified to correspond to that shown in FIG. 7, wherein the sheet is cut along line 244, which corresponds to fold line 59 of FIG. 2, and is folded along line 246, corresponding to cutout line 54 of FIG. 2, to form tab 250, shown in FIG. 9. A further fold along line 248 produces the horizontal tab portion of tab 250. As shown in FIG. 9, the tab 250 is opposite the tab 124, and there is no tab opposite the tab 88, as in the case of the arrangement shown in FIG. 4. Because of this change, the sheet of FIG. 5 also has to be modified to correspond to the modified tab arrangement of FIG. 9. As illustrated in FIG. 8, this is accomplished by cutting lower right corner of the sheet at line 252, which corresponds to fold line 170 of the sheet of FIG. 2, and folding it along line 254, corresponding to cutout line 162 of the sheet of FIG. 3. A further fold along line 256 results in the formation of the horizontal tab portion. This arrangement produces tab 258, shown in FIG. 10, located on the edge which was at right angles to the fold line of tab 178 of FIG. 5, and leaves vacant the spot previously occupied by tab 178. This change is necessary in order to provide a horizontal tab portion to be located against the portion 245 at the edge of the lower sheet opposite the tab 88 shown in FIG. 9. The horizontal tab portions of tabs 250 and 124 of FIG. 9 will contact the edge portions 247 and 249 extending at right angles to tabs 218 and 258 of FIG. 10.

To produce a pallet from two single sheets of material without any waste, the tabs of each sheet are formed so that the fold lines connecting the tabs to the sheets correspond to cuts or slits in the other sheet. In other words, when the sheets are superposed, each such fold line in one sheet is aligned with an edge resulting from a slit or cut in the other sheet. For example, in FIG. 2, the fold lines 40, 82, 84 and 59 along the left side of the sheet 36 are matched by corresponding cut lines 160, 194, 196 and 162 respectively, in the sheet 156 of FIG. 2. At right angles to the lines just mentioned, fold lines 168, 208 and 170 along the right side of the sheet 156 are matched by cut lines 38, 78 and 54 in the sheet of FIG. 2. Not all cut lines are matched by fold lines, a situation illustrated by the cut line 234 in FIG. 3, which has no counterpart fold line in the sheet of FIG. 2, and by the fold lines separating the horizontal tab portions from the vertical tab portions, which obviously have no corresponding cut lines. It is only the fold lines connecting a tab to a sheet that correspond to cut lines in the opposite sheet.

It should now be apparent that the present invention provides a very economical pallet construction which is light weight, simple to manufacture, easy to dispose of, easy to use, particularly since its construction permits four-way entry, and capable of supporting relatively heavy loads. To manufacture the pallet, it is merely necessary to stamp the slits and, if it is desired to make the folding operation more simple, score portions corresponding to the fold lines. The sheets are then ready to be shipped to the point at which the pallets will be used where they can be assembled on location quickly merely by folding the tabs and then gluing or stapling the tabs to the opposite sheet. Because the pallet sheets can be formed from inexpensive material with no waste, can be shipped and stored in flat unassembled condition at low cost, and can be assembled easily and quickly, the pallets are inexpensive. The pallet of the present invention is especially suitable for supporting a load consisting of stacked packages or units, rectangular or otherwise regular in shape, since such a load distributes the weight fairly evenly over the upper surface of the pallet. Any shape suited for being supported by a pallet, however, can be supported on the pallet of this invention.

What I claim is:
1. A pallet, comprising:
 (a) four substantially enclosed passageways open at each end for receiving the forks of a lift truck,
 (b) two passageways being in spaced parallel relationship to form one pair of passageways and the other two passageways being in spaced parallel relationship to form another pair of passageways,
 (c) the pairs of passageways being at substantially right angles to each other and intersecting in crisscross fashion so that intersecting portions of passageways are common to each other,
 (d) the passageways comprising upper and lower faces and side walls,
 (e) the upper face of each passageway being comprised of one sheet and the lower face of each passageway being comprised of a second sheet, and
 (f) the side walls of the passageways being formed of integral portions of the sheets extending transversely thereto.

2. A pallet as recited in claim 1, wherein the integral portions of the sheets forming the side walls of the passageways have end portions extending substantially parallel to the faces of the sheets and being attached to the sheet opposite the sheet of which they are an integral part.

3. A pallet as recited in claim 1, wherein each sheet is comprised of corrugated cardboard.

4. A pallet as recited in claim 1, wherein each integral connection between a side wall of a passageway and one of the faces of the passageway is aligned with an edge of the other face of the passageway, and constitutes a fold line.

References Cited

UNITED STATES PATENTS

| | | | |
|---|---|---|---|
| 3,124,627 | 3/1964 | Hood | 264—45 |
| 3,135,640 | 6/1964 | Kepka et al. | 264—45 |
| 3,187,069 | 6/1965 | Pincus et al. | 264—45 |
| 3,007,663 | 11/1961 | Huck | 108—57 |
| 3,118,400 | 1/1964 | Kemp et al. | 108—58 |
| 3,165,078 | 1/1965 | White | 108—56 |
| 3,302,593 | 2/1967 | Roberts | 108—56 |
| 3,307,504 | 3/1967 | Cloyd et al. | 108—58 |
| 2,595,375 | 5/1952 | Weirich et al. | 206—52 |
| 2,618,937 | 11/1952 | Francis | 229—8 X |
| 2,970,797 | 2/1961 | Desbois | 108—56 |
| 3,000,494 | 9/1961 | Monroe | 206—52 |

BOBBY R. GAY, Primary Examiner

G. O. FINCH, Assistant Examiner

U.S. Cl. X.R.

108—51